Feb. 11, 1941.    G. MOUNTJOY ET AL    2,231,369
DISTORTIONLESS BIASED DETECTOR NETWORK
Filed Oct. 14, 1938
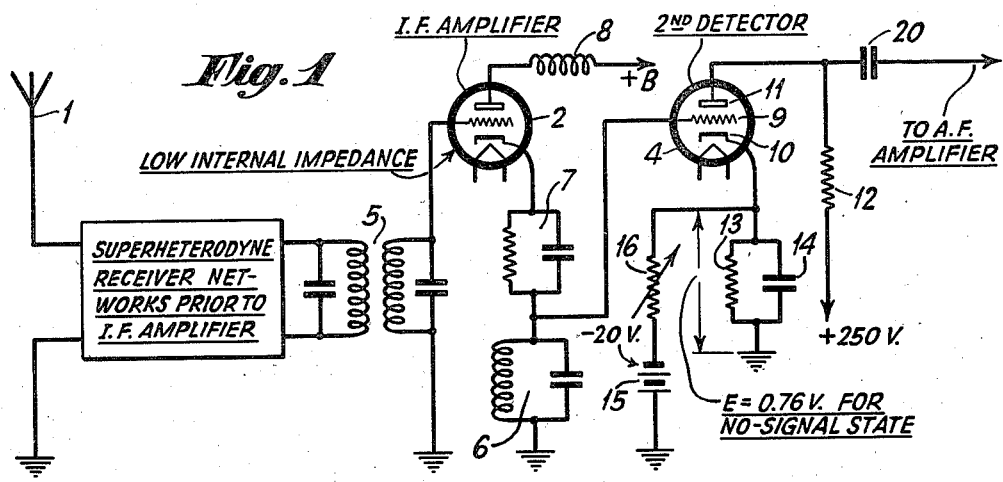
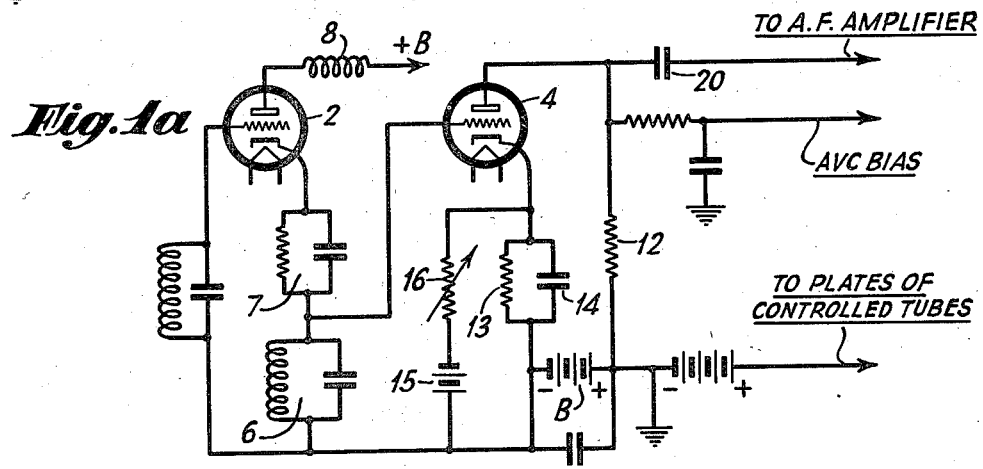
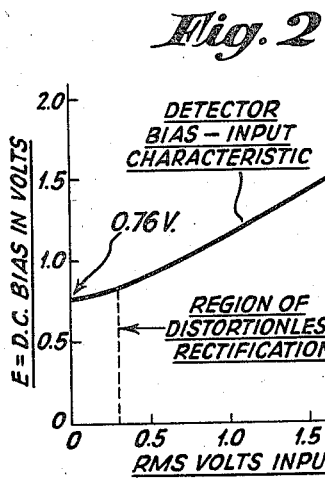
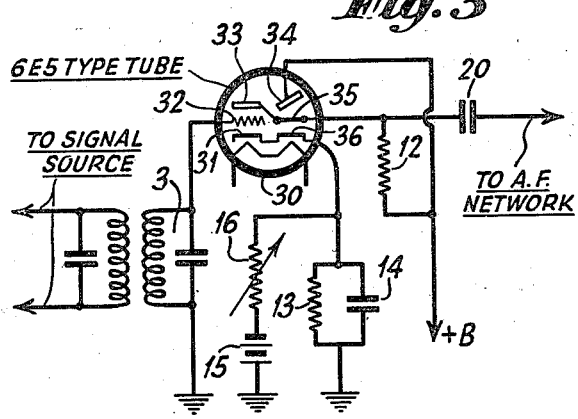
INVENTORS
GARRARD MOUNTJOY
AND DUDLEY E. FOSTER
BY
ATTORNEY.

Patented Feb. 11, 1941

2,231,369

UNITED STATES PATENT OFFICE 2,231,369

DISTORTIONLESS BIASED DETECTOR NETWORK

Garrard Mountjoy, Manhasset, N. Y., and Dudley E. Foster, South Orange, N. J., assignors to Radio Corporation of America, a corporation of Delaware Application October 14, 1938, Serial No. 235,056

7 Claims. (Cl. 250—36)

Our present invention relates generally to detection systems, and more particularly to biased detectors of the plate circuit rectification type arranged for distortionless operation.

One of the main objects of our present invention is to provide a plate circuit rectification type detector whose constants are so chosen that it has a substantially wide region of distortionless rectification and provides substantial gain at carrier and audio frequencies.

Another important object of the invention is to provide a triode detector whose constants are so chosen that distortionless operation is produced with any signal input between a range of 0.3 to 2.0 R. M. S. volts input; the detector input being coupled to a low internal impedance source of modulated signal energy.

Another object of our invention is to improve generally the detection efficiency of detectors, and more especially to provide biased detector circuits of the plate rectification type which are not only reliable and efficient in operation, but are economically manufactured and assembled in radio receivers.

The novel features which I believe to be characteristic of our invention are set forth in particularity in the appended claims; the invention itself, however, as to both its organization and method of operation will best be understood by reference to the following description taken in connection with the drawing in which we have indicated diagrammatically several circuit organizations whereby our invention may be carried into effect.

In the drawing:

Fig. 1 schematically shows a receiving system embodying one form of the invention, Fig. 1a illustrates a mode of securing A. V. C. bias from the detector in Fig. 1, Fig. 2 graphically illustrates the detection characteristic of the detector in Fig. 1, Fig. 3 shows a modification of the invention.

Referring now to the accompanying drawing, wherein like reference characters designate similar circuit elements in the different figures, the novel detection network of our invention is shown embodied in a receiver of the superheterodyne type. Of course, the detector may be employed in any other type of receiving system, and those skilled in the art are fully aware of the construction of the various types of signal receiving systems which can be utilized in connection with this invention. Let it be assumed that the receiving system shown in Fig. 1 is a superheterodyne receiver adapted for use in the broadcast band of 550–1500 kc. Such a receiver will comprise the customary signal collector 1 which picks up the intelligence-modulated carrier energy, and the collected energy is transmitted to a first detector network through one or more tunable radio frequency amplifiers. The first detector may be of any well known type, and its I. F. output will be transmitted through one or more I. F. amplifiers.

The numeral 2 designates the I. F. amplifier tube which feeds the signals to the input circuit of the detector tube 4. In order to provide the amplifier stage with a low internal impedance, the circuit 6 is disposed in the grounded cathode lead of tube 2. The usual bias resistor-condenser network 7 is disposed between cathode and the circuit 6 for providing a normal bias on the amplifier grid. Appropriate positive potential may be applied to the plate of amplifier 2 through a radio frequency choke coil 8.

Circuit 6 is resonated to the operating I. F. value, and is effectively connected between the control grid 9 and cathode 10 of the detector tube 4. The tube 4 can be a triode of the 6F5 type, and the plate 11 thereof is connected to a current source, (not shown), through a plate load resistor 12. The resistor may have a magnitude of approximately 100,000 ohms, and a potential of about 250 volts is applied to the plate 11. The cathode 10 is connected to ground by a resistor 13 of about 700 ohms; the resistor is by-passed for I. F. currents by condenser 14 having a magnitude of 0.2 mf. There is provided in shunt with the self-bias resistor 13 an auxiliary 20 volts current source 15 whose negative terminal is connected through adjustable resistor 16 to the cathode end of the bias resistor. The resistor 16 is preferably adjusted so that the effective potential E across resistor 13, in the no-signal state, is 0.76 volt.

The relation between R. M. S. volts input and the magnitude of E is illustrated in Fig. 2. It will be observed that there exists a wide region of distortionless rectification, as shown by the area between the vertical dotted lines. The curve demonstrates that the grid bias of the detector tube is influenced by the signal input and by the current from auxiliary current source 15. The latter may be, if desired, a bleeder resistor in the common voltage supply source of the receiver. With no signal input to detector 4, the bias on grid 9 is determined by the normal flow of current of the triode, and by the current from 15. In this case, since the source 15 opposes the space current flow through resistor 13, the normal self-bias of the tube has its value reduced, as is shown by the initial portion of the curve. Between the region of 0.3 volt and 2.0 volts (R. M. S. input) is the region of operation which produces no distortion in the output of the triode. The constants of the detector circuit are so selected that the necessary bias E is developed to produce distortionless operation with any input between the aforesaid limits.

The audio voltage is tapped off across the load resistor 12, and the voltage is transmitted to the audio utilization network through condenser 20. Since the grid bias of the detector tube is close to zero, the signal source coupled to the detector input circuit 6 is of low internal impedance. The amplifier 2 has circuit 6 in its cathode lead to provide such a low impedance source. Of course, any other type of signal network which has a low internal impedance may be used in place of the cathode loaded amplifier tube 2. For example, a power triode could be used.

The detector circuit disclosed herein has substantial gain; high radio amplification is not needed. It can readily feed the usual audio amplifier network. Further, it provides carrier amplification, and hence delivers sufficient direct current voltage for A. V. C. bias purposes. This is secured by a rearrangement of grounding points to permit the D. C. voltage across resistor 12 to be applied to the grids of controlled tubes. One connection shown in Fig. 1a, which provides this is to ground B+ of the detector tube, and replace the present ground by the negative terminal of the B source, which is by-passed to ground for low R. F. impedance. The control tubes have a higher B++ voltage above ground for their plate supply. In this respect the detector is of advantage over a diode rectifier or a degenerative plate circuit detector (also termed an infinite impedance diode detector). The latter have no gain, and hence need substantial radio frequency amplification prior to detection.

Again, the present type of detector circuit is of advantage over the so-called linear power detector circuit, wherein the linear portion of the biased detector characteristic is utilized. In the latter type of detector circuit it is required to utilize sufficient radio frequency amplification prior to the detector input circuit in order to operate along the linear part of the characteristic. Again, it is necessary to utilize a high negative grid bias in such a circuit. In the present detector circuit the range of signal input voltage is relatively wide, although the magnitudes of the signal voltages themselves are small. A gain of 30 can be expected from this type of detector. With 1 volt R. M. S. input on the grid, as high as 40 volts D. C. can be secured.

While it is believed unnecessary to enter into a discussion of the theoretical aspects of the functioning of the detector circuit, yet it is pointed out that, in general, harmonic distortion created by curvature in the square law detection characteristic is balanced out by complementary distortion introduced by proper choice of the detector circuit constants. In other words, the resulting detector characteristic is not necessarily a linear one; it is more accurate to describe the detector circuit as being distortionless in operation over a predetermined wide range of signal input voltages. Hence, it will be seen that the present detector circuit not only provides freedom from harmonic distortion, but at the same time produces sufficient audio voltage and carrier voltage gain to render the network desirable for use in the standard type of broadcast receiver.

In Fig. 3 there is illustrated a circuit arrangement wherein the detector circuit of the present invention performs an additional function. The numeral 30 designates a tube of the 6E5 type. This type of tube is well known to those skilled in the art, and is disclosed and claimed in U. S. Patent No. 2,051,189, issued on Aug. 18, 1936 to H. M. Wagner. Briefly, this type of tube comprises a triode section which includes cathode 31, control grid 32 and plate 33. The tube also includes a fluorescent target 34, and an electron ray control element 35. The control element 35 is disposed between the target 34 and a second cathode 36, both cathodes 31 and 36 being at a common potential. The observer views the interior face of the target which is coated with a fluorescent material, and the target is usually cone-shaped. The control electrode 35 projects from the plate 33, and both electrodes are connected through the load resistor 12 to a source of positive potential B. The target 34 is connected to the positive end of load resistor 12.

In this arrangement the triode section 31—32—33 functions as the biased detector section, and the biasing network connected in the cathode circuit is the same as in the case of Fig. 1. The audio voltage is taken off from the negative end of load resistor 12. Normally the positive target 34 receives electrons from the cathode 36. These electrons cause the fluorescent coating on the inner face of the target to glow, and the target has the appearance of a ring of light. When the potential of electrode 35 is less positive than the target, electrons flowing to the target are repelled by the electrostatic field of the control electrode, and, therefore, the electrons do not reach that portion of the target directly behind electrode 35. The control electrode 35 is said to cause a shadow on the glowing target. Since the potential of electrode 35 varies in response to the potential drop across load resistor 12, it will be clear that the shadow on target 34 is of variable width. Therefore, it will be seen that the electron indicator is able to indicate the signal carrier amplitude by virtue of the direct current voltage drop in the detector plate circuit. In this circuit arrangement, the voltage of the source B may be 250 volts, and the magnitude of the load resistor 12 can be 500 ohms.

While we have indicated and described several systems for carrying our invention into effect, it will be apparent to one skilled in the art that our invention is by no means limited to the particular organizations shown and described, but that many modifications may be made without departing from the scope of our invention, as set forth in the appended claims.

What we claim is:

1. In a detection network, a tube of the type including at least a control grid, cathode and output electrode, a signal input circuit connected between the control grid of the tube and ground, a resistive load connected to the output electrode circuit, a grid bias resistor in the space current path of the tube connected between cathode and ground, an auxiliary bias source connected in shunt with the bias resistor, said input circuit having a relatively low impedance, said auxiliary source opposing the voltage across the bias resistor so as to provide a range of effective bias for the grid which is so related to a predetermined range of signal input voltages as to provide distortionless operation of the detector over said signal input range.

2. In a detection network, a tube of the type including at least a control grid, cathode and output electrode, a signal input circuit connected between the control grid of the tube and ground, a resistive load connected to the output electrode circuit, a grid bias resistor in the space current path of the tube connected between cathode and ground, an auxiliary bias source connected in shunt with the bias resistor, said auxiliary source opposing the voltage across the bias resistor so as to provide a range of effective bias for the grid which is so related to a predetermined range of signal input voltages as to provide distortionless operation of the detector over said signal input range, and a signal source connected to said input circuit, said source including an electronic stage of low internal impedance.

3. In a detection network, a tube of the type including at least a control grid, cathode and output electrode, a signal input circuit connected between the control grid of the tube and ground, a resistive load connected to the output electrode circuit, a grid bias resistor in the space current path of the tube connected between cathode and ground, an auxiliary bias source, comprising a current source in series with a resistor, connected in shunt with the bias resistor, said input circuit having a relatively low impedance, said auxiliary source opposing the voltage across the bias resistor so as to provide a range of effective bias for the grid which is so related to a predetermined range of signal input voltages as to provide distortionless operation of the detector over said signal input range.

4. In a detection network, a tube of the type including at least a control grid, cathode and output electrode, a signal input circuit connected between the control grid of the tube and ground, a resistive load connected to the output electrode circuit, a grid bias resistor in the space current path of the tube connected between cathode and ground, an auxiliary bias source connected in shunt with the bias resistor, said input circuit having a relatively low impedance, said auxiliary source opposing the voltage across the bias resistor so as to provide a range of effective bias for the grid which is so related to a predetermined range of signal input voltages as to provide distortionless operation of the detector over said signal input range, means for deriving an audio voltage from said resistive load, and additional means for deriving a direct current voltage from said load.

5. In combination, a tube provided with at least a cathode, grid and plate, a signal input circuit coupled between the grid and cathode, a signal source of relatively low impedance adapted to impress signal voltage chosen from a range of 0.3 to 2.0 R. M. S. volts upon said input circuit, means connected between the grid and cathode providing a range of negative grid bias voltages such that said tube rectifies signals in a distortionless manner over said signal voltage range, a resistive load connected between said cathode and plate, said load having audio voltage developed thereacross which is subtsantially amplified with respect to the audio modulation amplitude at said input circuit.

6. In a detector network of the type comprising a tube having at least a cathode, grid and anode, a signal input circuit of relatively low impedance connected between the grid and cathode, a load impedance connected between the anode and cathode, a grid biasing network connected to said cathode and having an element thereof in the tube space current path, said biasing network including a current source in opposition to the space current through said element, said biasing network developing such grid bias values over a predetermined range of signal input voltages that the detector is distortionless over said range.

7. In combination with a signal amplifier having a low internal impedance, a detector tube having at least a cathode, a grid and plate, a signal input circuit coupled to said amplifier and being connected between said grid and ground, a resistive load connected to the plate, a grid bias resistor connected in the space current path of the detector tube between said cathode and ground, an auxiliary grid bias source connected in polarity opposition to the voltage developed across said bias resistor, said resistor and auxiliary source being chosen to provide distortionless detection over a range of signal input voltages of substantially 0.3 to 2.0 R. M. S. volts.

GARRARD MOUNTJOY.
DUDLEY E. FOSTER.